(12) United States Patent
Hashimoto et al.

(10) Patent No.: US 7,542,223 B2
(45) Date of Patent: Jun. 2, 2009

(54) MAGNETIC DISK DRIVE USING LOAD/UNLOAD AREA FOR DATA STORAGE

(75) Inventors: Minoru Hashimoto, Kanagawa (JP); Kenji Kuroki, Kanagawa (JP); Keishi Takahashi, Kanagawa (JP); Toshiroh Unoki, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 282 days.

(21) Appl. No.: 11/546,200

(22) Filed: Oct. 10, 2006

(65) Prior Publication Data

US 2007/0086106 A1    Apr. 19, 2007

(30) Foreign Application Priority Data

Oct. 14, 2005    (JP) .............................. 2005-300685

(51) Int. Cl.
G11B 20/12    (2006.01)
(52) U.S. Cl. .......................... 360/49; 711/112
(58) Field of Classification Search .................. None
See application file for complete search history.

(56) References Cited

U.S. PATENT DOCUMENTS

| | | | |
|---|---|---|---|
| 5,633,767 A | | 5/1997 | Boutaghou et al. |
| 6,026,463 A | * | 2/2000 | Klein .......................... 711/112 |
| 6,202,118 B1 | * | 3/2001 | Klein .......................... 711/112 |
| 6,480,361 B1 | | 11/2002 | Patterson |
| 6,920,009 B2 | | 7/2005 | Xu et al. |
| 6,937,419 B2 | * | 8/2005 | Suk et al. ....................... 360/75 |
| 2005/0068865 A1 | | 3/2005 | Kawakami et al. |
| 2005/0085322 A1 | | 4/2005 | Markley |

OTHER PUBLICATIONS

"Method to Improve Data Reliability in HDD Systems Using Load/Unload," Apr. 1, 2000, IBM TDB UK, Issue 432, p. 749.*
"Method for Data Recovery for 'Load/Unload on Data' in a Hard Drive," Jun. 1, 2000, IBM TDB UK, Issue 434, p. 1146.*
"Logical Addressing Scheme for Better Reliability of Load/Unload Files," Dec. 1, 1994, IBM TDB vol. 37, No. 12, pp. 387-388.*

* cited by examiner

Primary Examiner—Andrew L Sniezek
Assistant Examiner—James L Habermehl
(74) Attorney, Agent, or Firm—Townsend and Townsend and Crew LLP; Rambod Nader

(57) ABSTRACT

Embodiments of the invention provide ways to write data in a load/unload area. In one embodiment, address numbers (ranging from 981 to 1065) whose order of addressing by host equipment is later than that of address numbers (ranging from 1 to 980) as logical block addresses (LBAs) assigned to data sectors in the data area are assigned as LBAs to data sectors whose absolute block addresses (ABAs) range from 1001 to 1100 in the load/unload area. As a result, when the host equipment performs addressing in a magnetic disk drive, the priority order given to the load/unload area becomes low. Accordingly, with the storage capacity being increased, it is possible to prevent the substantial performance from decreasing.

18 Claims, 8 Drawing Sheets

(A)

(B)

MAGNETIC DISK DRIVE USING LOAD/UNLOAD AREA FOR DATA STORAGE

CROSS-REFERENCES TO RELATED APPLICATIONS

This application claims priority from Japanese Patent Application No. JP2005-300685, filed Oct. 14, 2005, the entire disclosure of which is incorporated herein by reference.

BACKGROUND OF THE INVENTION

The present invention relates to a technology for increasing the storage capacity of a magnetic disk drive that adopts a load/unload method, and more particularly to a technology for writing data without decreasing the reliability and performance for a load/unload area.

There are magnetic disk drives adopting the load/unload method that uses a ramp located in the vicinity of the outer circumference of a magnetic disk as a region into which a head/slider is retracted while the magnetic disk is not accessed. In the vicinity of the outer circumference of the magnetic disk, a load/unload area is defined on a recording surface as an area used when the head/slider is loaded. A data area, which is an area to which user data is written, is defined on the inner circumferential side of the load/unload area.

The load/unload area also includes an area to which servo data is written. Therefore, if the firmware is changed, it is possible to write data to this area in the same manner as that in the case of the data area from the viewpoint of a format of the magnetic disk. However, while the head/slider which is loaded from the ramp to the magnetic disk is in the load/unload area, the floating posture of the head/slider is unstable. Accordingly, there is a higher possibility that the head/slider will touch the recording surface of the magnetic disk, causing damage to the magnetic disk. For this reason, in order to use the load/unload area as a recording area of user data, it is necessary to take the reliability of data into consideration.

Patent document 1 (U.S. Pat. No. 5,633,767) states that data is written to a load/unload area of a disk drive. Patent document 1 also states that a magnetic disk drive usually includes error recovery procedure and that if the performance decreases, data is reallocated to an alternate track or cylinder. Moreover, according to patent document 1, even if an error rate of data written to the load/unload area slowly increases or irregularly increases, no problem arises. However, if the error rate exceeds a threshold value, there is a fear of causing a serious failure of the magnetic disk drive.

Patent document 2 (U.S. Pat. No. 6,480,361) states that in order to prevent a transducer from touching written data at the time of loading, it is necessary to form, in the vicinity of the outer circumference of a magnetic disk, a tolerance band to which data is not written. Patent document 2 discloses a technology in which a movable ramp mechanism is provided to extend, in the vicinity of the outer circumference of the disk, an available area to which data can be written. Patent document 3 (Japanese Patent Laid-open No. 2005-085322) discloses a technology for using a load/unload area as an area to which data is written by forming an arc-shaped load/unload zone in the circumferential direction of the load/unload area, and by writing data to an area other than the load/unload zone.

BRIEF SUMMARY OF THE INVENTION

As shown in the patent documents described in the background art, in order to use the load/unload area as a recording area of user data, it is necessary to cope with a defect that occurs on the magnetic disk as a result of touching the loaded head/slider. In the present invention, hereinafter, user data is merely called "data", and data excluding the user data is properly called "servo data", "test data", or the like so that various kinds of data are distinguished from one another.

Servo data is also written to the load/unload area, and data sectors are defined in the load/unload area. Therefore, if it is possible to prevent the performance from decreasing and also to ensure the reliability, the load/unload area can contribute to an increase in storage capacity of the magnetic disk drive. In particular, because the load/unload area is defined on the outer circumferential side of the magnetic disk, if what is called a zone bit recording method is adopted, the number of data sectors included in one track on the outer circumferential side of the magnetic disk is larger than that on the inner circumferential side. Accordingly, an effect of increasing the storage capacity is large.

Thus, an object of the present invention is to provide a magnetic disk drive that is capable of writing data to a load/unload area of a magnetic disk without decreasing the reliability or the performance. Another object of the present invention is to provide a manufacturing method for manufacturing such a magnetic disk drive. Still another object of the present invention is to provide a method for writing/reading data in the magnetic disk drive.

The load/unload area is apt to be damaged when the head/slider is loaded. Therefore, in order to use the load/unload area as a data recording area, it is necessary to devise a method for improving the reliability and the performance using a method different from that used for the data area. According to the present invention, an address number whose order of addressing by the host equipment is lower than that of an address number assigned to a data sector in the data area as a logical block address (hereinafter referred to as "LBA") is assigned as an LBA to a data sector in the load/unload area. The load/unload area is apt to be damaged by loading of the head/slider also after data is written, and consequently a read error will easily occur.

If a read error occurs when data written to the load/unload area is read out, an error recovery procedure including a plurality of steps is executed to recover from the error. Accordingly, the performance decreases. On the other hand, if host equipment adopts an LBA addressing method, the host equipment performs addressing of a location at which a file or a program is written, in order of address numbers of LBAs. Accordingly, the frequency in the use of a data sector having an address number whose priority is low decreases. Therefore, because the frequency of accesses to the load/unload area decreases, it is practically possible to prevent the performance from decreasing.

The order of address numbers may be the ascending order or the descending order, or the order for which some arithmetic operation is performed, so long as it is the priority order used when a system of the host equipment writes data to the magnetic disk. If the priority order is given in the ascending order of address numbers, each of all data sectors in the load/unload area has, as a logical block address, an address number that is larger than a maximum value of address numbers of data sectors in the data area. This is equivalent to the fact that any one of the data sectors in the load/unload area has a logical block address whose address number is the largest among those assigned to all data sectors on the magnetic disk. A logical block address whose address number is the largest may be assigned to a track that is located on the outermost circumferential side or the innermost circumferential side among data tracks that may be used in the load/unload area.

A data track that may be used means that a servo track to which this data track belongs has no defect, and that the data track in question includes at least one data sector having no defect. In consideration of the manufacturing tolerance, the data area and the load/unload area are defined so that the number of servo tracks included in the load/unload area ranges from 9% to 12% of the total number of servo tracks written to the magnetic disk. An alternate sector to which a data sector located in the load/unload area is reassigned is formed in the load/unload area. As a result, it is possible to use the load/unload area as a data recording area without exerting an influence on the data area, and thereby to increase the total storage capacity of the magnetic disk drive. Even if a read hard error has not occurred in a data sector in the load/unload area, when data is written to the data sector in question, write verification is performed. Moreover, when data is written to the load/unload area, the same data is written to a plurality of data sectors. As a result, it becomes possible to reliably write data to the load/unload area.

By executing error correction code (hereinafter referred to as ECC) offline correction for the load/unload area earlier than that for the data area, it is possible to recover from a read error without executing an error recovery procedure more than necessary. After a read hard error occurs in a data sector of the load/unload area, if a command to write data to the same data sector is received, automatic reassignment to an alternate sector is performed instead of writing the data to the data sector in question. When a read hard error has occurred in a data sector of the load/unload area, it is more desirable to use an alternate sector from the viewpoint of ensuring the reliability than writing the data to the same data sector again with write verification being performed. In addition, for the same reason, the automatic reassignment for the load/unload area, which is executed when a read error has been recovered by a specific step of the error recovery procedure, is executed earlier than that for the data area.

According to another aspect of the invention, there is provided a manufacturing method of a magnetic disk drive that is suitable for writing data to a load/unload area. The firmware is configured to assign an address number as a logical block address to each data sector in the load/unload area in such a manner that the addressing order of addressing data sectors in the load/unload area by the host equipment becomes later than that of addressing data sectors in the data area. Although servo data may be written by a self-servo write method, it may also be written by a servo track writer in the present invention. When defect registration inspection is performed for data sectors in the load/unload area, loading/unloading of the head/slider from/to a ramp is repeated a plurality of times, ranging from 7,000 times to 13,000 times, so as to cause most or all scars to occur. This makes it possible to prevent a new defect sector from appearing after the defect registration. In addition, if a criterion of defect-sector identification for data sectors in the load/unload area is set to a level lower than that for data sectors in the data area, it is possible to eliminate a data sector, the write performance of which has decreased, from the data sectors in the load/unload area with a higher degree of accuracy.

According to the present invention, the magnetic disk drive capable of writing data to the load/unload area of the magnetic disk without decreasing the reliability and the performance may be provided. Moreover, according to the present invention, the manufacturing method for manufacturing such a magnetic disk drive may be provided. Furthermore, according to the present invention, the method for writing/reading data in the magnetic disk drive may be provided.

DETAILED DESCRIPTION OF THE INVENTION

Explanation of Magnetic Disk Drive

Figure 1:
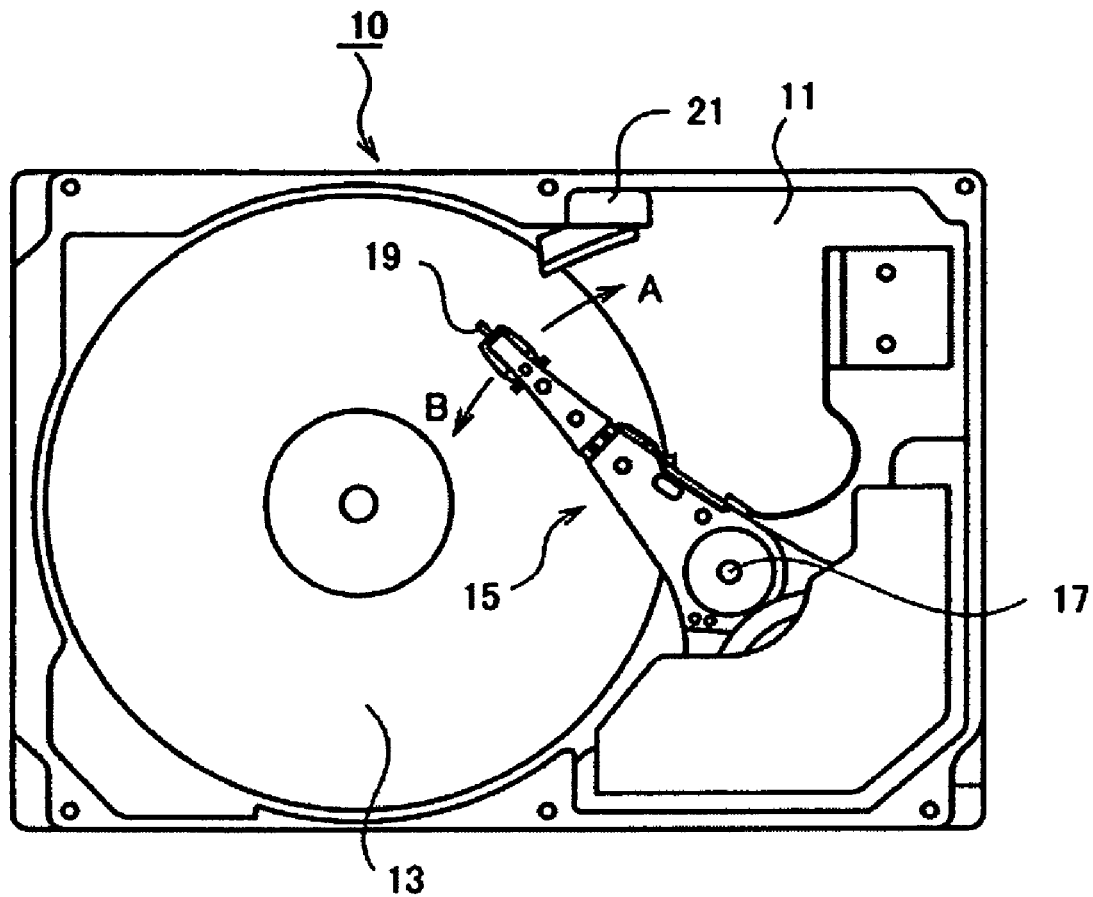
FIG. 1 is an exemplary plan view schematically illustrating a configuration of a magnetic disk drive according to an embodiment of the present invention.

FIG. 1 is a plan view schematically illustrating a configuration of a magnetic disk drive 10 according to an embodiment of the present invention. A magnetic disk 13 and a head support mechanism 15 are mounted on a base 11. The head support mechanism 15 is called a "rotary actuator". A head/slider is mounted on the tip side of the head support mechanism 15. The head/slider pivotally moves about a pivot shaft 17 in a direction of an arrow A or B. The head/slider is constituted of a slider and a magnetic head. The magnetic head which is constituted of a read head and a write head is formed with a specified gap being provided between the magnetic head and the slider. A lift tab 19 is formed at the tip of the head support mechanism 15. When the rotation of the magnetic disk 13 is about to stop, the head support mechanism 15 rotates in the direction of arrow A with the lift tab 19 sliding on an inclined plane of a ramp 21 so that the head/slider is withdrawn. Thus, a method which uses the ramp 21 to withdraw the head/slider is called a "load/unload method".

Figure 2:
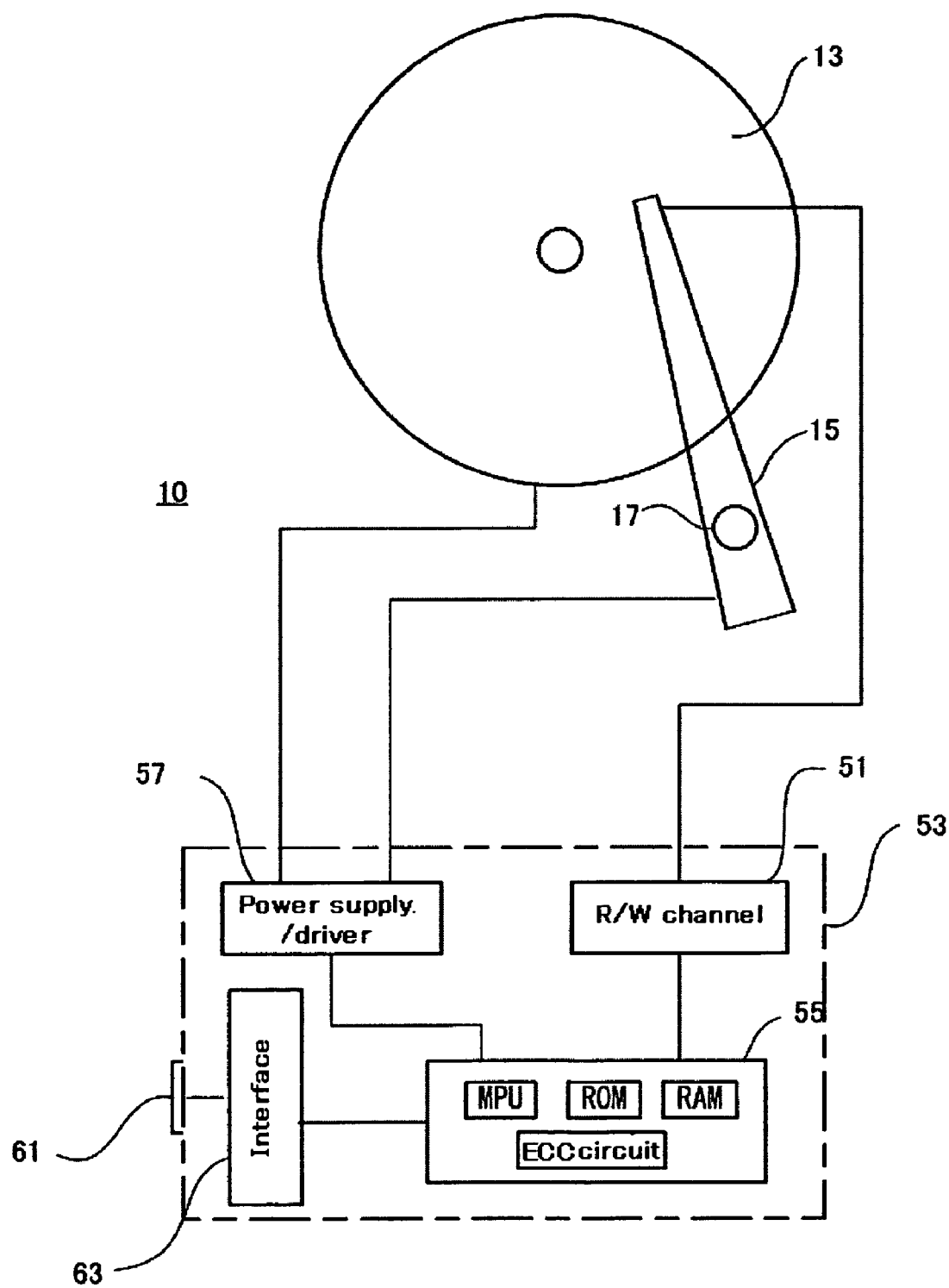
FIG. 2 is an exemplary schematic block diagram illustrating the magnetic disk drive shown in FIG. 1.

FIG. 2 is a schematic block diagram illustrating the magnetic disk drive 10 shown in FIG. 1. A circuit board 53 of the magnetic disk drive 10 is equipped with a read/write (R/W) channel 51, a controller 55, a power supply/driver 57, an interface 63, and an interface connector 61. The R/W channel 51 includes: a modulation circuit for converting a data bit string into a bit string that is written to the magnetic disk; a demodulator for performing the conversion in the backward direction; a parallel/serial converter for performing conversion between parallel data and serial data; a variable gain amplifier (VGA) for adjusting a read signal to a constant voltage level; and a Viterbi decoder for combining data in a PRML method.

The controller 55 includes: an MPU for controlling communications with host equipment, and for controlling operation of the magnetic disk drive; a ROM for storing firmware and various kinds of programs, which are executed by the MPU; a RAM that is used to execute the programs, and that is used as a work area; and an ECC circuit for generating correction bits corresponding to data bits transmitted from the host equipment, and for correcting a bit error of data read from the magnetic disk 13. The MPU interprets a read command and a write command that are transmitted from the host equipment, and generates a control signal of a voice coil motor by use of a read signal of servo data and a position control program, and then transmits the control signal to the power supply/driver circuit 57 to control the operation of the head support mechanism 15. The programs to be executed by the MPU include firmware for writing/reading data to/from a data sector in a load/unload area according to this embodiment.

The interface 63 includes: a buffer memory for temporarily storing data to be transmitted to/from the host equipment; and a buffer controller for controlling the buffer memory. The power supply/driver 57 includes: a driver for supplying an operating current to a spindle motor that rotates the magnetic disk 13, and for supplying an operating current to a voice coil that drives the head support mechanism 15; a DA converter; and a power supply circuit.

Figure 3:
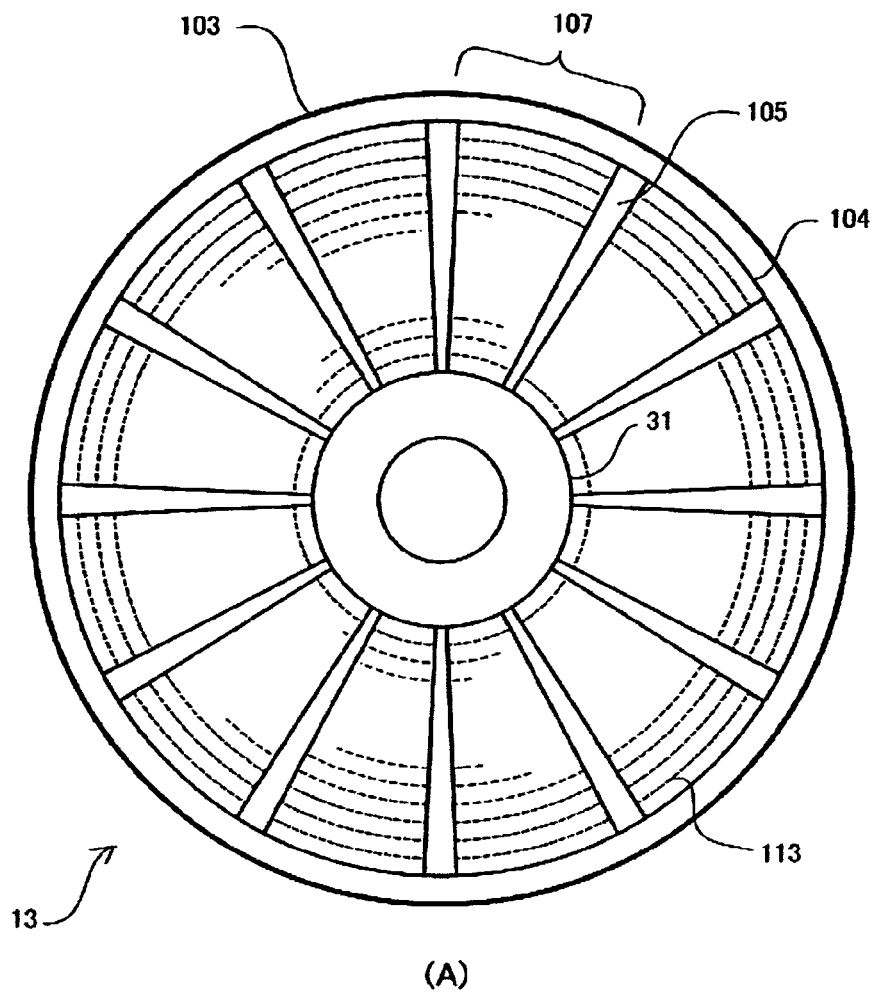
FIG. 3 illustrates an exemplary format of each recording surface of a magnetic disk.
Figure 3:
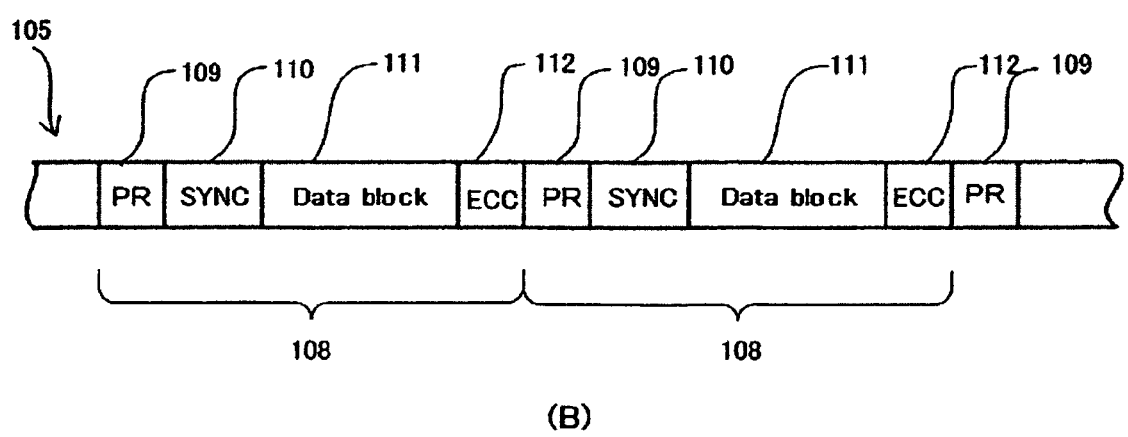

FIG. 3 illustrates a format of each recording surface of a magnetic disk. The magnetic disk 13 has two recording surfaces on the upper and lower sides. The magnetic disk drive 10 adopts a data-surface servo system. As shown in FIG. 3(A), a plurality of servo sectors 105 are radially defined on substantially the whole recording surfaces of the magnetic disk 13. Servo data including a cylinder number, a servo sector number, and a burst pattern is written to each of the servo sectors 105. The servo data written to each of the servo sectors 105 defines a plurality of concentric tracks 113, each of which specifies positions of write and read heads in the radial direction.

A data sector area 107 is formed between servo sectors 105 that are adjacent to each other in the circumferential direction. In each servo sector 105, the servo data is not written to an outer circumference 103 of the magnetic disk 13. The servo data ends at a position of a servo track 104. Hereinafter, a cylinder including a servo track written at an outermost circumferential position which is defined by the servo data is called an outermost circumferential cylinder [L/UL] 104. In addition, a cylinder including a servo track 31 written at an innermost circumferential position is called an innermost circumferential cylinder [Data] 31. The outermost circumferential cylinder [L/UL] 104 will be described in detail later. When a plurality of read heads included in the head support mechanism are positioned at specific servo tracks, each of which corresponds to each recording surface, the cylinder is a set of the servo tracks.

For a complex magnetic head that has a structure in which a write head and a read head are separated, and that is formed on the slider, when the read head is positioned at a specific servo track to write data, the write head is not positioned at the same servo track, but at a position spaced apart from the servo track in question by an amount of read/write offset. A track through which the write head passes when data is written is called a data track. FIG. 3(B) is a diagram illustrating part of a format of the data track. In each data sector area 107, data sectors 108, the number of which is about from 2 to 5, are defined as shown in FIG. 3(B). The firmware identifies a position of the data sector 108 in the radial direction on the basis of a cylinder number, and identifies the position in circumferential direction on the basis of a servo sector number. The firmware identifies each data sector 108 by measuring the elapsed time after a servo sector which is adjacent to the data sector area 107 is detected, or by counting the number of the data sectors 108 that have passed through the read head after the detection of the servo sector.

One of the data sectors 108 includes: a preamble 109 that is used when the read/write channel 51 adjusts a gain and achieves synchronization; a SYNC pattern 110 used to find the top of data, which is written to a data block 111, at the time of reading; the data block 111 having a length of 512 bytes to which data is written; and an ECC area 112 to which an error correction code (hereinafter referred to as ECC) is written, the ECC being used to inspect and correct a bit error of data written to the data block 111. In the present embodiment, it is not necessary to limit the length of the data block 111 to 512 bytes. The data block 111 may also have another length.

Configuration of Outer Circumferential Part of Magnetic Disk

Figure 4:
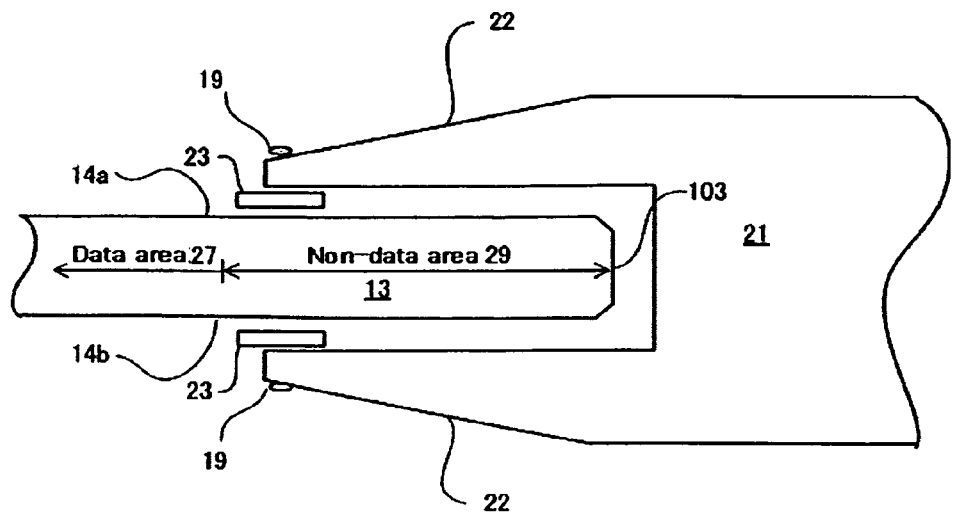
FIG. 4 is an exemplary cross section illustrating an area in the vicinity of the outer circumference of the magnetic disk, and a ramp.

FIG. 4 is a cross section illustrating an area in the vicinity of the outer circumference 103 of the magnetic disk 13, and the ramp 21. The magnetic disk 13 has recording surfaces 14a, 14b. The head support mechanism 15 (shown in FIG. 1) supports two head/sliders 23 corresponding to these recording surfaces. Among the elements of the head support mechanism 15, FIG. 4 illustrates only the lift tabs 19 and the head/sliders 23. The ramp 21 has two inclined planes 22. FIG. 4 illustrates a moment at which the lift tab 19 leaves the inclined plane 22 at the time of loading.

A position of the head/slider at a moment at which the lift tab 19 touches the inclined plane 22 at the time of unloading slightly differs from the position of the head/slider 23 shown in FIG. 4. A data area 27 located on the inner circumferential side and a non-data area 29 located on the outer circumferential side are defined on each of the recording surfaces 14a, 14b of the magnetic disk. The data area 27 is an area to which data is written by the firmware; the non-data area 29 is an area to which data is not written in an ordinary magnetic disk drive. There is no difference between the recording surfaces 14a and 14b in physical structure including a magnetic layer and protective layer of the data area 27 and those of the non-data area 29. In addition, a system area, which is dedicated to the system's use without allowing users to use it, is formed in the data area 27.

Method for Writing Servo Data

The non-data area 29 includes a load/unload area, and an area located on the outer circumferential side of the load/unload area. The magnetic disk drive 10 writes servo data to the magnetic disk using a self-servo write method. When the servo data is written to the recording surfaces 14a, 14b of the magnetic disk 13 using the self-servo write method, the head/slider 23 is moved from the inner circumferential side of the magnetic disk towards the outer circumferential side as an example. When the read head reads servo data that has been written, the firmware calculates a position at which servo data is written next, and then places the read head of the head/slider 23 at the new position. Here, the write head is formed in the slider in such a manner that the write head is located on the outer circumferential side of the magnetic disk relative to a position of the read head. As a result of repeating such steps, if servo data is written from the inner circumferential side towards the outer circumferential side in a self-propagation manner, the lift tab 19 eventually touches the inclined plane 22 of the ramp 21.

Because a light shock at this time causes particular vibrations of the head/slider 23, the firmware may detect, from a position error signal (PES) of servo data to be read by the read head, that the lift tab 19 has touched the ramp 21. When it is detected that the lift tab 19 has touched the inclined plane 22, the firmware stops writing servo data.

Definitions of Load/Unload Area

Figure 5:
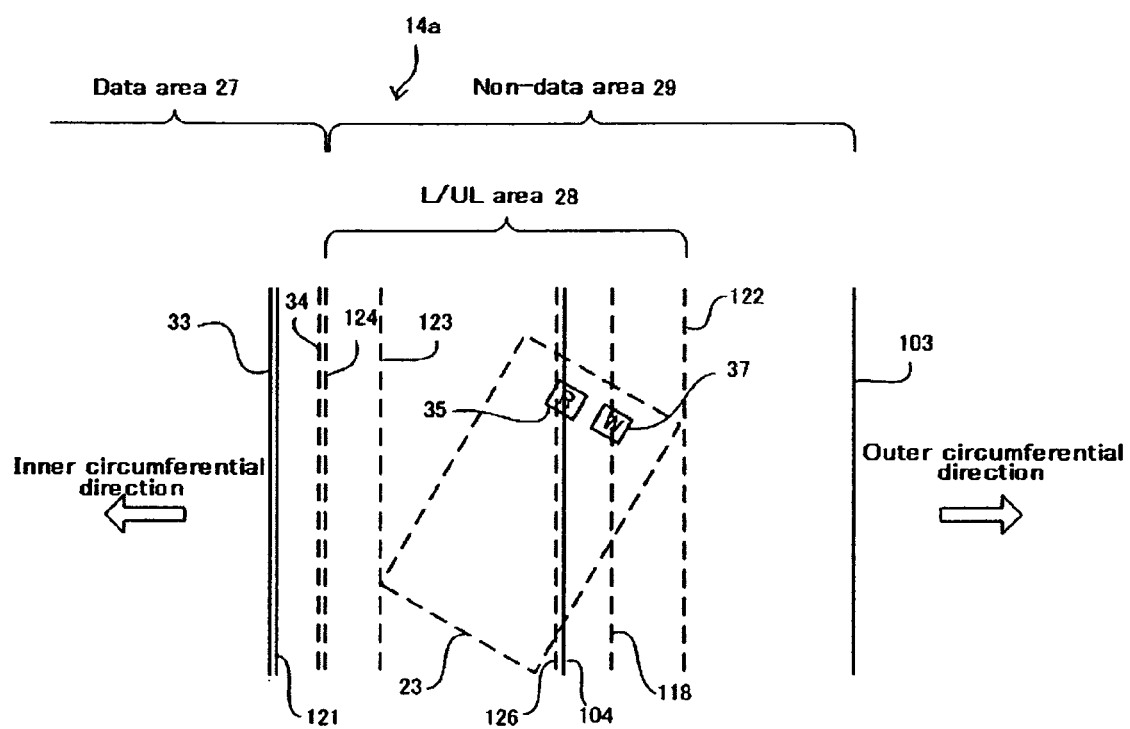
FIG. 5 is an exemplary diagram illustrating how a load/unload area and other areas on the recording surface are defined.

Next, a load/unload area which is defined on the recording surface 14a will be described with reference to FIG. 5. FIG. 5 is a diagram illustrating how the load/unload area and other areas on the recording surface 14a are defined. As the lift tab 19 goes down on the inclined plane 22 so that the head/slider 23 which has been withdrawn into the ramp 21 is loaded, a lifting force from the airflow on the surface of the magnetic disk is gradually exerted on an air bearing surface of the head/slider 23. At this time, because the head/slider 23 is under the influence of the airflow with the lift tab 19 supporting the head/slider 23, behavior of the head/slider 23 is unstable. When the lift tab 19 further goes down on the inclined plane 22, there is a moment at which the lift tab 19 eventually leaves the inclined plane 22. However, at this time, the behavior of the head/slider 23 is still unstable, and the head/slider 23 is not supported by the ramp. Accordingly, the head/slider 23 is in a state in which the head/slider 23 is most apt to touch the magnetic disk.

Here, the load/unload area 28 is defined as an area including: an area drawn in the circumferential direction of the rotating magnetic disk with the vertical projection of the head/slider 23 that is made onto the recording surfaces 14a, 14b at a moment at which the lift tab 19 leaves the inclined plane 22 when the head/slider 23 is loaded into the magnetic disk 13 from the ramp 21; and a margin area within a specified range that is expected on the inner circumferential side of the drawn area. The non-data area 29 includes: the load/unload area 28; and an area in which the head/slider 23 cannot fly over the magnetic disk, the area being located between the load/unload area 28 and the outer circumference 103. The data area 27 is an area defined by excluding the non-data area 29 from each of the recording surfaces 14a, 14b.

FIG. 5 illustrates a read head 35 and a write head 37 in the head/slider 23. The head/slider 23 in FIG. 5 is simplified to merely show that there is provided a read/write offset between the read head 35 and the write head 37, and that the read head 35 is located on the inner circumferential side relative to a position of the write head 37. FIG. 5 shows a position of the head/slider 23 in FIG. 4 at a moment at which the lift tab 19 leaves the inclined plane 22 of the ramp 21 at the time of loading.

A line 122 is indicated on the recording surface 14a at a border position between the outer circumference 103 of the magnetic disk 13 and the inner circumferential side. The line 122 is a circle that is drawn on the rotating magnetic disk with the contour vertical projection existing on the outermost circumferential side of the head/slider 23 immediately after loading. In addition, a line 123, which is located on the inner circumferential side relative to the line 122, is a circle that is drawn on the rotating magnetic disk with the contour vertical projection existing on the innermost circumferential side of the head/slider 23 immediately after loading. In FIG. 5, the load/unload area is defined as a circular ring area surrounded by the line 122 and a line 121. In the circular ring area, a margin is added on the inner circumferential side to an area defined by the line 122 and the line 123. A circular ring area existing between the line 121 and the line 123 corresponds to a margin area that is used to securely separate the data area 27 from the non-data area 29 in consideration of the tolerance of the ramp 21 and that of the head support mechanism 15.

A position of an outermost circumferential cylinder [L/UL] 104 and a position of a line 118 are shown on the inner circumferential side of the line 122. The outermost circumferential cylinder [L/UL] 104 is a servo track at which the read head 35 is located immediately before writing is stopped because the lift tab 19 touches the inclined plane 22 of the ramp 21 at the time of writing servo data from the inner circumferential side of the magnetic disk 13 towards the outer circumferential side using the self-servo write method. The line 118 corresponds to a data track at which the write head 37 is located when the read head 35 is located at the outermost circumferential cylinder [L/UL] 104.

Servo data is also written to an area between the line 104 and the line 118 so that a servo track is defined. However, when the head/slider 23 moves from a position shown in FIG. 5 to the outer circumferential side, the lift tab rides on the ramp. Accordingly, data cannot be written and read. For this reason, the outermost circumferential cylinder [L/UL] 104 is treated as a servo track that is written on the outermost circumferential side among all servo tracks written on the recording surface 14a. Moreover, although data may also be written to an area between the line 118 and the outermost circumferential cylinder [L/UL] 104, it is not possible to read the data. The outermost circumferential data track 126, which is a data track existing on the outermost circumferential side in the load/unload area 28, is defined at the same position as that of the outermost circumferential cylinder [L/UL] 104 or at a position in the vicinity thereof. Thus, when servo data is written in the self-servo write method, the load/unload area includes an area to which servo data is not written, and an area to which data cannot be actually written even if servo data is written. The present embodiment may also be applied to a method in which a servo track writer writes servo data.

A line 34 and a line 124, which are located at the boundary between the data area 27 and the non-data area 29, correspond to the outermost circumferential data track of the data area and the innermost circumferential data track of the load/unload area, respectively. The outermost circumferential cylinder [Data] 33 and the innermost circumferential cylinder [L/UL] 121 are shown on the inner circumferential side of the line 34. The outermost circumferential cylinder [Data] 33 corresponds to a servo track that is written on the outermost circumferential side so that data is written to the data area 27; the innermost circumferential cylinder [L/UL] 121 corresponds to a servo track that is written on the innermost circumferential side so that data is written to the load/unload area. When the read head 35 is located at the outermost circumferential cylinder [Data] 33, the write head 37 is located at the outermost circumferential data track 34. On the other hand, when the read head 35 is located at the innermost circumferential cylinder [L/UL] 121, the write head 37 is located at the innermost circumferential data track 124 of the load/unload area.

The firmware is configured as follows. A ratio of the number of servo tracks in the data area to the number of all servo tracks is set beforehand on the basis of the size of the magnetic disk, the tolerance of the head support mechanism, the assembling tolerance between the magnetic disk and the head support mechanism, and the like. In addition, the outermost circumferential cylinder [Data] 33 is selected from among written servo tracks. The ratio is selected so that, for example, for one recording surface, the number of servo tracks in the load/unload area ranges from 9% to 12% of the number of all servo tracks. Incidentally, the number of all servo tracks corresponds to the number of servo tracks ranging from the innermost circumferential cylinder [Data] 31 to the outermost circumferential cylinder [L/UL] 104.

Next, a method for using the load/unload area 28 to write data will be described. In this embodiment, in the load/unload area, an area to which data is written is an area existing on the inner circumferential side of the outermost circumferential data track 126 at which the head/slider 23 is released from the ramp 21. If the load/unload area is used as an area to which data is written, on the one hand, there is an advantage that the storage capacity of the magnetic disk drive increases. On the other hand, there are disadvantages that because the load/unload area is apt to be scarred by a touch with the head/slider 23, the reliability as a data recording area decreases, and that the performance at the time of writing or reading decreases by the execution of Error Recovery Procedure (hereinafter referred to as ERP). This embodiment provides a method for increasing the reliability of write data, and for preventing the performance from decreasing, with the advantage of the increase in storage capacity being enjoyed.

Method of Defect Inspection Registration

There is a high possibility that when the head/slider 23 is loaded, a data sector in the load/unload area 28 will be damaged at its surface. Therefore, defect inspection registration is performed using a method that differs from that used for data sectors in the data area so that a defect is eliminated from a magnetic disk as a product, and so that a new defect will hardly occur after the magnetic disk becomes the product. When the defect inspection registration is performed for data sectors in the load/unload area, as is the case with defect registration for data sectors in the data area, test data is first written to all data sectors. In this case, before or after the test data is written, loading/unloading of the head/slider 23 is repeated about from 7000 times to 13,000 times (a set of operation constituted of loading and unloading is counted as once). As a result of experiments, it is found out that if the loading/unloading is repeated the number of times as described above, the head/slider 23 touches the recording surface of the magnetic disk at the time of loading, and accordingly a ratio of the occurrence of a new scar is saturated.

It is thought that a point at which the head/slider 23 touches the recording surface changes every time although the frequency of the head/slider's touching the recording surface at the time of loading is kept unchanged. However, the reason why the ratio of the occurrence of a scar is saturated may be inferred as follows. Because an angle of texture such as a rail or a pad of an air bearing surface of the head/slider 23 is steep in a stage in which the texture has just been manufactured, if the head/slider 23 touches the recording surface at the time of loading, the recording surface is apt to be damaged. However, if a touch with the magnetic disk is repeated by loading/unloading, the angle is rounded, and accordingly the texture hardly damages the recording surface even if it touches the recording surface. Therefore, loading/unloading is repeated the specified number of times before and after test data is written, and then a judgment is made as to whether or not a read error has occurred. After that, an absolute block address (hereinafter referred to as ABA) of a detected defect sector is registered in a primary defect map (hereinafter referred to as PDM). As a result, the firmware does not assign an LBA to the data sector in question. Therefore, the security at the time of using the load/unload area as a data recording area is improved. A magnetic disk drive according to this embodiment repeats loading/unloading until most or all scars occur, and then the magnetic disk drive registers defect sectors. Accordingly, a new scar hardly occurs at the time of loading the head/slider in a product stage.

When the defect inspection registration is performed, the number of symbols of an error correction code ECC at the time of reading test data from each data sector in the load/unload area is made smaller than the number of symbols at the time of reading test data from each data sector in the data area so that an error will easily occur. This makes it possible to increase the capability of detecting a scar. When a write/read test is performed for a data area to detect a defect sector, the number of ECC symbols is made smaller than that at the time of using the data area as a product. For example, although 20 symbols are used for the use as a product, the number of symbols is reduced to 4 symbols at the time of performing the write/read test for the data area.

At this time, the number of symbols of ECC at the time of a write/read test for the load/unload area is set at 2 symbols. Because the number of bits of read data, an error of which may be corrected, decreases with the decrease in the number of ECC symbols, a read error will more easily occur. Accordingly, even a data sector in which only a slight defect exists may be registered so as to disallow the use of the data sector. This makes it possible to improve the reliability when the load/unload area is used as an area to which data is written.

In the write/read test for the defect inspection registration, test data is read from the same data sector a plurality of times. If the number of times the test data could be read without applying an ERP is greater than or equal to a threshold value, it is judged that the write/read test has succeeded. In this embodiment, by making the number of times corresponding to the load/unload area, which is used as the threshold value, smaller than the number of times corresponding to the data area, it is also possible to increase a possibility that the write/read test will fail. In general, a criterion of defect identification for the load/unload area is made at a value lower than that for the data area so that a defect may be more easily identified. Thus, in contrast to the data area, the defect registration is performed for the load/unload area with more stress being placed on not the increase in storage capacity but a point that a data sector potentially having a defect is excluded. As a result, it is possible to achieve the reliability of data written to the load/unload area.

Assignment of Logical Block Address

In this embodiment, in order to use the load/unload area as an area to which data is written, a maximum value of an address number of LBA is assigned to a data sector formed in the load/unload area. Examples of an addressing method for a magnetic disk drive executed by host equipment include a CHS method and an LBA method. The CHS method is a method in which the host equipment specifies a cylinder number (C), a head number (H), and a servo sector number (S), which represent a physical structure of the magnetic disk drive, to access a data sector. The LBA method is a method in which the host equipment assigns an address number to a data sector in order of accesses irrespective of a physical structure of the magnetic disk drive. Host equipment that uses a magnetic disk drive based on the ATA/ATAPI standard or the SCSI standard adopts the LBA method.

Figure 6:
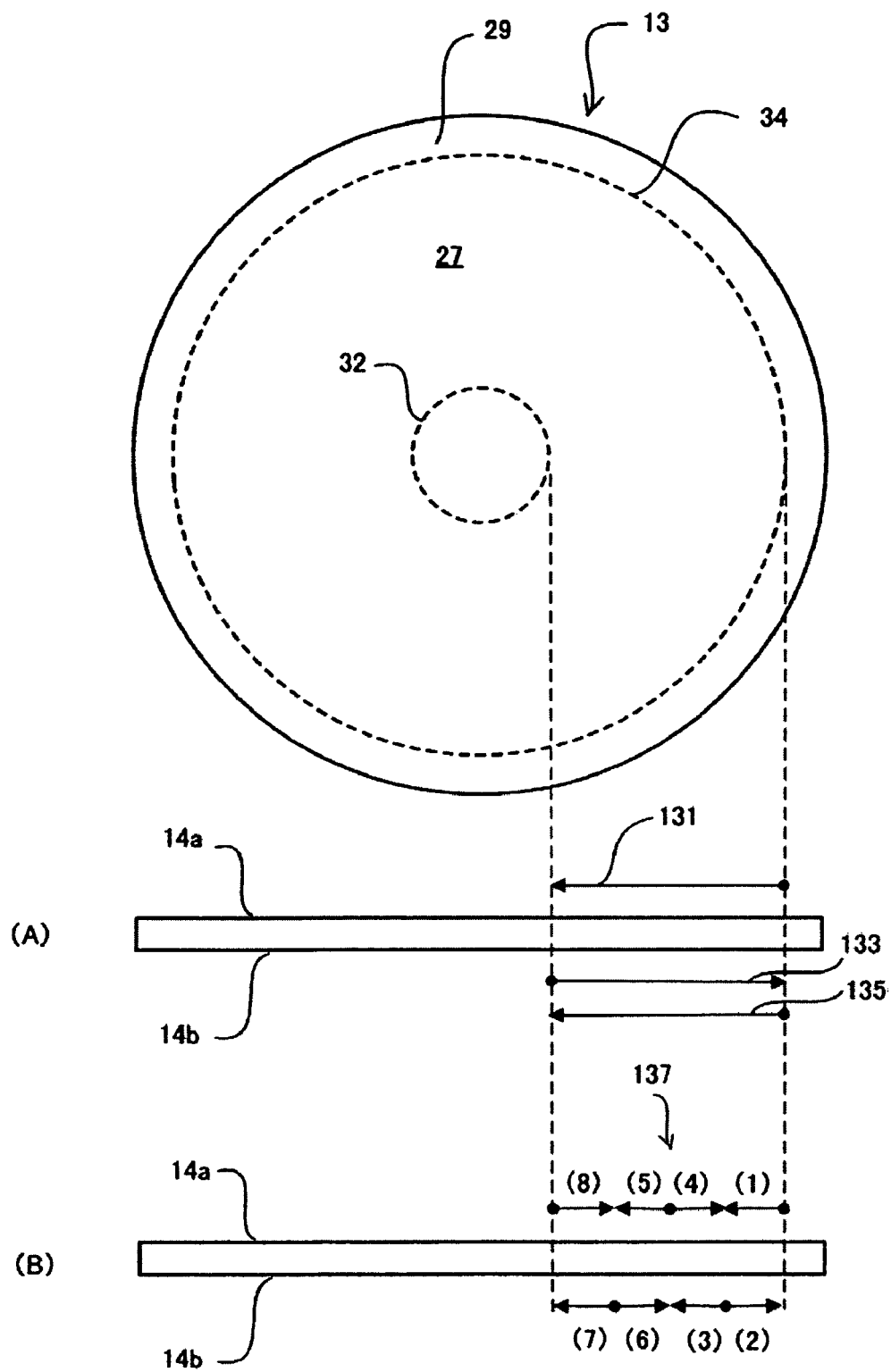
FIG. 6 illustrates an example of an LBA assignment method.

FIG. 6 illustrates as an example a method for assigning LBA to each data sector in the data area 27. An assignment method for the load/unload area 28 (refer to FIG. 7) will be described later. Each consecutive address number is assigned as an LBA to each of all data sectors ranging from the outermost circumferential data track 34 of the data area 27 to the innermost circumferential data track 34 thereof. A position of a data sector on the recording surfaces 14*a*, 14*b* of the magnetic disk 13 in the radial direction is identified by the cylinder number (C) of servo data; the position of the data sector in the circumferential direction is identified by the data sector number (S) of the servo data. Moreover, the recording surface is identified by the head number (H). The firmware identifies an actual position of a data sector by parameters of C-H-S to position the head/slider 23.

Before an LBA is assigned, an ABA is sequentially assigned by use of each consecutive address number in the ascending order to each data sector that is physically located in the circumferential direction and in the radial direction. As an example of the order of assignment, for example, as indicated with a line 131 shown in FIG. 6(A), first starting from the outermost circumferential data track 34 in the data area of the recording surface 14*a*, each address number in the ascending order is assigned to each data sector in the same data track in the circumferential direction. When the assignment to all data sectors included in one data track is completed, the assignment is performed in the ascending order up to the innermost circumferential data track 32 with a position moving by one cylinder towards the inner circumferential side. Usually, an ABA having the smallest address number, at which the frequency of accesses from the host equipment becomes the highest, is assigned to the outermost circumferential data track 34 belonging to the outermost circumferential cylinder [Data] 33 where a data transmission rate is the largest. After that, as indicated with a line 133, an ABA is assigned to each data sector on the recording surface 14*b* from the innermost circumferential data track 32 towards the outermost circumferential data track 34. In another case, as indicated with a line 135, an ABA is assigned from the outermost circumferential data track 34 towards the innermost circumferential data track 32 also on the recording surface 14*b*.

Another assignment method for assigning an ABA is that, as indicated with the order (1) through (8) of a line 137 in FIG. 6(B), each of the recording surfaces 14*a*, 14*b* is partitioned into a plurality of zones in the radial direction before an ABA is assigned. The write/read test is performed for each data sector to which an ABA is assigned, and thereby a defect sector is detected. Then, an address number of the defect sector is registered in the PDM. When an LBA is assigned to each data sector, the firmware assigns as the LBA an address number in the ascending order to each data sector with the PDM being referred to so as to skip a defect sector among data sectors whose ABAs are address numbers in the ascending order. For example, when a defect of a data sector whose ABA is 3 is registered, the firmware skips the data sector in question, and then maps the two addresses as follows:

(ABA=1, LBA=1), (ABA=2, LBA=2), and (ABA=4, LBA=3).

At the time of writing or reading data, upon receiving a command and an LBA from the host equipment, the firmware calculates an ABA from the LBA and converts the ABA into CHS to identify a target data sector. Therefore, if address numbers of LBAs are assigned to all data sectors on the recording surfaces 14*a*, 14*b*, the host equipment may access each data sector only by specifying an LBA. When the host equipment writes a file or a program to a magnetic disk drive, a data sector having a smaller LBA is used earlier. In actuality, the host equipment accesses the magnetic disk drive on a cluster basis, the cluster being constituted of a plurality of consecutive data sectors.

If the host equipment adopts a file system, the host equipment manages files written to the magnetic disk by use of a directory entry and a File Allocation Table. The directory entry stores, on a file basis, a number (start cluster number) of a cluster to which its file name and top data are written. In addition, the file system stores, in a table format, information about how clusters are connected to form a file, that is to say, the order of clusters.

When the host equipment reads a file from the magnetic disk, the host equipment searches the directory entry for an appropriate file name, and then reads out a start cluster number written corresponding to this file name. After the host equipment reads out data from a cluster pointed to by this start cluster number, the host equipment refers to the File Allocation Table to find out a cluster that is pointed to by the next number of the start cluster number, and then reads out data therein. Thereafter the host equipment reads out data from the magnetic disk with reference to the file system in the same steps.

In this embodiment, as described below, to a data sector in the load/unload area, the firmware assigns as an LBA an address number whose order of addressing by the host equipment is later than that of an LBA assigned to a data sector in the data area. Usually, the addressing order becomes later with the increase in address number of LBA. Therefore, a value of an address number of each data sector in the load/unload area always becomes larger than the largest address number among address numbers assigned to data sectors in the data area 27. Therefore, the largest address number among address numbers of all data sectors including data sectors in the data area and data sectors in the load/unload area is assigned as an LBA to any one of data sectors in the load/unload area 28.

Figure 7:
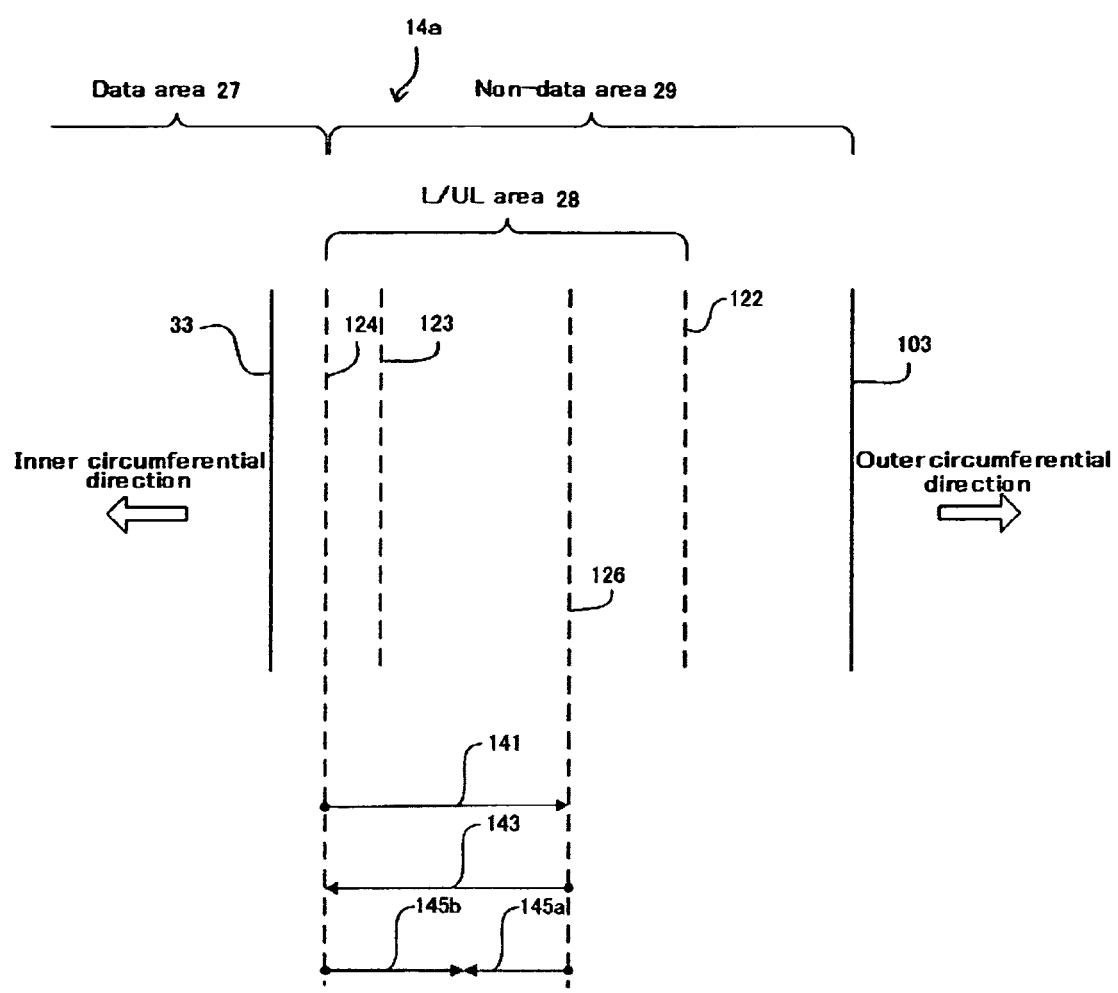
FIG. 7 is an exemplary diagram illustrating an example of an assignment method for assigning an LBA to each data sector in the load/unload area.

FIG. 7 is a diagram illustrating a method for assigning an ABA and an LBA to each data sector located in the load/unload area 28. Because FIG. 7 illustrates part of FIG. 5, detailed description of elements denoted by identical reference numerals will be omitted. One of the ABA assignment methods will be described below. As indicated with a line 141, an address number next to the largest ABA address number of the data area 27 is assigned to a data sector included in the innermost circumferential data track 124 of the load/unload area. Thereafter, an address number is assigned to each data sector in order up to the outermost circumferential data track 126 of the load/unload area. If the innermost circumferential cylinder [L/UL] 121 is registered as a defect cylinder, an address number next to the largest LBA address number of the data area 27 is assigned to a data track belonging to an available cylinder that is closest to the innermost circumference (to a data track located on the outer circumferential side relative to the innermost circumferential data track 124).

As is the case with data sectors located in the data area, when an LBA is assigned to each assigned ABA, the assignment is performed with a defect sector being skipped if the defect sector is detected. As a result, a data sector having an LBA whose address number is the largest is included in the outermost circumferential data track 126 or a data track belonging to an available cylinder that is closest to the outermost circumference (a data track located on the inner circumferential side relative to the outermost circumferential data track 126).

In contrast to the line 141, according to a line 143, an address number is assigned as a logical block address from the outermost circumferential data track 126 of the load/unload area up to the innermost circumferential data track 124 thereof in the descending order of addressing by the host equipment. As a result, a data sector having an LBA whose address number is the largest is included in the innermost circumferential data track 124 or a data track belonging to an available cylinder that is closest to the innermost circumference. For lines 145*a*, 145*b*, an address number is assigned as a logical block address from the outermost circumferential data track 126 of the load/unload area or the innermost circumferential data track 124 towards the center in the descending order of addressing by the host equipment. Incidentally, the LBA assignment method shown here is merely an example. Therefore, it is also possible to adopt any other assignment method in which address numbers of LBAs corresponding to all data sectors in the load/unload area 28 are assigned in such a manner that the order of addressing the data sectors in the load/unload area 28 by the host equipment becomes later than that of addressing data sectors in the data area 27.

The host equipment does not identify a physical location of each data sector to which an LBA has been assigned. The physical location of each data sector to which the LBA has been assigned is identified only by the firmware that is executed by the controller of the magnetic disk drive. When the host equipment stores data in the magnetic disk drive, the host equipment need not be conscious of whether or not a data sector is located in the load/unload area 28. Because the addressing order of addressing each data sector located in the load/unload area 28 by the host equipment is later, the frequency of actually using the data sector to store data is low.

It cannot be said that only devising the assignment of LBAs could substantially improve the reliability of data written to the data sector in the load/unload area. However, it may be said that devising the assignment of LBAs could prevent the performance from decreasing, and could increase the storage capacity. To be more specific, if data that has been written to a data sector in the load/unload area cannot be read out, the ERP is frequently executed, or reassignment to an alternate sector occurs, which causes the performance to decrease. However, because the frequency of using data sectors located in the load/unload area is low, it is possible to prevent the performance from decreasing by the execution of the ERP from a practical standpoint.

Figure 8:
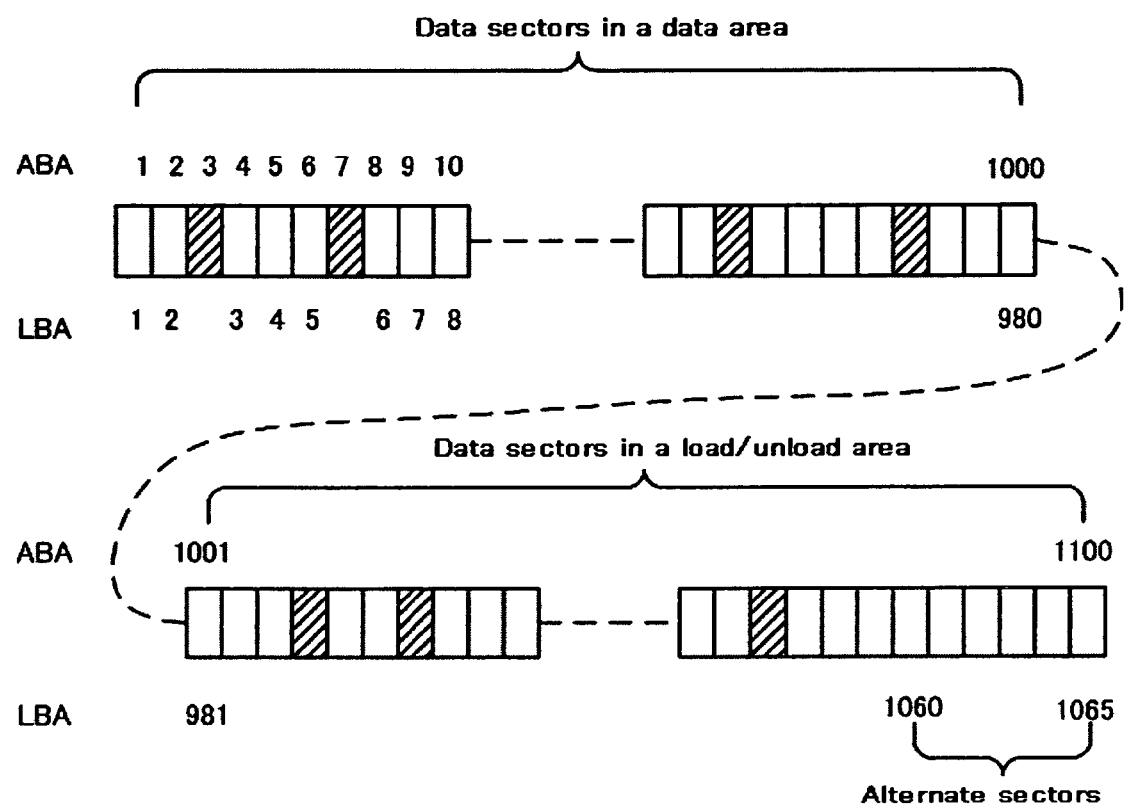
FIG. 8 is an exemplary diagram illustrating an example of ABAs and LBAs that are assigned to all data sectors on a recording surface.

FIG. 8 is a diagram illustrating an example of ABAs and LBAs that are assigned to data sectors on the recording surfaces 14a, 14b. Address numbers ranging from 1 to 1000 as ABAs are assigned to all data sectors located in the data areas on the recording surfaces 14a, 14b. Further, address numbers ranging from 1001 to 1100 as ABAs are assigned to all data sectors located in the load/unload areas on the recording surfaces 14a, 14b. For data sectors having ABA3, ABA7, and the like, which are indicated with oblique lines, these ABAs are stored in the PDM as a result of defect inspection by the write/read test. The firmware converts between an ABA and an LBA with reference to the PDM.

In the example shown in FIG. 8, address numbers ranging from 981 to 1065 are assigned as LBAs to data sectors in the load/unload area. An address number, which is larger than a maximum value of address numbers of data sectors in the data area, is assigned as an LBA to each data sector in the load/unload area. Therefore, at the time of writing data to the magnetic disk drive from the host equipment, the priority order given to each data sector in the load/unload area is lower than the priority order given to each data sector in the data area. A table used to convert an LBA into CHS, the PDM, a mapping table used for reassignment, and the like, are stored in a dedicated area of the magnetic disk 13. When the power is supplied to the magnetic disk drive, the table, the PDM, and the mapping table are read out into the RAM. Moreover, the example taken in this embodiment is a case where the number of magnetic disks is one and the number of recording surfaces is two. Here, even if a plurality of magnetic disks are provided and accordingly the number of recording surfaces increases, it is possible to assign LBAs in like manner.

Alternate Sector for Reassignment

As shown in FIG. 8, the data sectors ranging from LBA 1060 to 1065 in the load/unload area are assigned as alternate sectors used for reassignment of data sectors in the load/unload area. The reassignment is such processing that after the use of a magnetic disk drive as a product starts, the firmware assigns an alternate sector instead of a data sector whose write performance or read performance has decreased so that the alternate sector is used instead of the data sector in question. The mapping table stores both LBAs. When the host equipment specifies an LBA of a data sector whose performance has decreased, the firmware accesses an alternate sector instead of the data sector in question. This is how the reassignment is performed. The host equipment is not required to know that the data sector having the specified LBA has been reassigned. Accordingly, it is not necessary to change the LBA to access written data.

An alternate sector may be assigned to a data track belonging to an available cylinder that is the closest to the outermost circumferential cylinder [L/UL] 104, or to a data track belonging to an available cylinder that is the closest to the innermost circumferential cylinder [L/UL] 121. In another case, an alternate sector may also be assigned to another data track in the load/unload area. By disallowing assignment of a data sector in the load/unload area to an alternate sector in the data area, it is possible to prevent the storage capacity of the data area from decreasing as a result of writing data to the load/unload area. As compared with the load/unload area, the data area has the higher performance, and the reliability of write data is also higher. Therefore, even if the load/unload area is used as an area to which data is written, it is desirable to prevent the storage capacity of the data area from decreasing in this manner. However, the present embodiment does not always disallow an alternate sector used for a data sector in the load/unload area to be formed in the data area.

Redundancy of Write Data

In this embodiment, when the host equipment specifies a write command and a start cluster number to write data, if a cluster specified at this time includes a data sector in the load/unload area 28, the controller 55 controls the magnetic disk drive 10 so that the data sector in the load/unload area 28 is provided with redundancy. To be more specific, two data sectors located in the load/unload area are used as a set, and accordingly the same data is written to the two data sectors. Usually, one data sector is specified as a main sector, whereas the other data sector is specified as a backup sector. At the time of writing, the same data is written to both a main data sector and a backup data sector. At the time of reading, data is first read out from the main data sector. If reading of data from the main data sector results in a read hard error, and consequently the data cannot be read, or if an error cannot be recovered until a specified step of the ERP, the data is read out from the backup data sector. Here, the read hard error means an error that cannot be recovered even if the ERP is executed. The ERP according to this embodiment will be described later.

Write Verification

In this embodiment, when data is written to a data sector in the load unload area, the controller 55 performs write verification. The write verification is performed as follows. Immediately after data is written, the written data is read to verify whether or not a read error has occurred. When data is written to a data area, usually from a viewpoint that importance is placed on the performance, write verification is not performed with the exception of special cases, for example, write operation immediately after the occurrence of a read hard error. However, each data sector in the load/unload area is easily scarred, and accordingly will easily become a defect sector. Therefore, it is desirable to check whether or not the write has been successfully made. To be more specific, if a read error has occurred as a result of performing the write verification, reassignment to an alternate sector provided in the load/unload area is performed to handle the data sector in question as a defect sector.

Error Recovery Procedure

In general, if a read error occurs at the time of writing or reading data, the magnetic disk drive executes an ERP to recover the error. The ERP is stored in a dedicated area of the magnetic disk 13 or a ROM of the controller 55. When the power of the magnetic disk drive is turned on, the ERP is read out into the RAM of the controller 55, and is then executed by the MPU. The ERP is constituted of a plurality of error recovery steps. The ERP steps are configured in the order that increases a possibility of recovery, and that does not result in a decrease in performance. If a read error or a write error occurs, each ERP step is successively executed. On completion of each step, retry is performed (in other words, reading is performed again) to check whether or not the error recovery has succeeded.

The ERP steps includes, for example: a step of changing the amount of off-track that is the amount of deviation between the center of the magnetic head and the track center; and a step of, in a case where the magnetic head includes an MR element, changing a value of a bias current applied to the MR device. The ERP steps further includes: a step of omitting servo calculation to prevent noises from entering at the time of the servo calculation; a step of ECC offline correction that corrects a bit error of data by specified calculation; and a step of adjusting parameters such as a gain and frequency of the PLL circuit. Moreover, the ERP steps further includes: a second SYNC step that uses a second synchronization signal for synchronization; a step of, when a sector pulse cannot be detected from servo data, generating a dummy pulse; and a step of decreasing the flying height of the head by decreasing the number of revolutions of the spindle motor so as to remove particles on the magnetic disk (this step is called low spin burnish). Besides the above steps, the ERP steps include many other error recovery steps.

If an error is recovered by ERP steps executed in an early stage, the decrease in performance caused by the ERP processing is small. However, the performance decreases more and more with the increase in the number of executed ERP steps. The ERP is so configured that a write or read error which has occurred in the data area may be most effectively recovered. An error occurring in the data area at the time of writing or reading is caused by, for example, the aged deterioration of a magnetic layer on a recording surface of the magnetic disk, a scar on the magnetic disk caused by an incidental touch with the head/slider, or environmental conditions such as temperature and atmospheric pressure. On the other hand, it is probable that a main factor of an error occurring in the load/unload area is a scar on the magnetic disk caused by a touch with the loaded head/slider. Therefore, using a configuration different from that of the ERP steps applied to the data area makes it possible to more effectively prevent the performance from decreasing. ERP steps applied to the load/unload area, which are adopted in this embodiment, will be described below.

ECC Offline Correction

An ECC circuit of the controller 55 checks whether or not a bit error exists on the basis of ECC corresponding to data that has been read. If the number of error bits is within a specified range, the bit error is corrected so that written data is recovered. Correction of a bit error by an ECC circuit in a hardware manner is called "on-the-fly ECC". In the on-the-fly ECC, for each read data, the number of bytes of which is specified, the hardware checks an occurrence position and bit pattern of an error to execute the on-the-fly ECC. Accordingly, although the processing speed of the on-the-fly ECC is fast, there is a limit in the number of error bits that may be corrected. As compared with data sectors in the data area, each data sector in the load/unload area is more easily scarred at the time of loading the head/slider. Therefore, the number of error bits which consecutively occur increases, and accordingly there is a higher possibility that an error correction will not be made by means of the on-the-fly ECC.

Here, ECC offline correction is a known error-bit correction method corresponding to the on-the-fly ECC. The ECC offline correction is an error correction method implemented by firmware. All of data having a length of 512 bytes is read out from one data sector, and the firmware sets an occurrence position of an error bit before correcting the error bit using ECC. For example, for data having a length of 512 bytes, the firmware sets an occurrence position of an error bit at intervals of 10 bits in order from the beginning. On the basis of the occurrence positions, the firmware detects an error that has occurred in a bit pattern, and then corrects the error. In another case, the firmware acquires information about an occurrence position of an error from the Viterbi decoder of the read/write channel 51. If the occurrence position of the error bit is specified to correct an error, it is not necessary to calculate the occurrence position of the error. Accordingly, for instance, the number of consecutive error bits is 170 bits for the on-the-fly ECC, whereas it increases up to 330 bits for the ECC offline correction.

When the ECC offline correction is used, the number of bits which may be corrected is large. However, because the ECC offline correction takes a long processing time, the ECC offline correction is set as a step to be executed later or last among the ERP steps for the data area. If ERP whose step configuration is the same as that for the data area is executed for the load/unload area, the ECC offline correction is executed in, for example, the 100th ERP step that is set as a step to be executed later or last. In this embodiment, on the assumption that there is a probability that a read error occurring in the load/unload area will be caused by a scar of the magnetic layer, if a read error which cannot be corrected by the on-the-fly ECC occurs in a data sector in the load/unload area, the ECC offline correction is executed in an early ERP step. As a result, if an error is caused by a scar and accordingly cannot be corrected by ERP steps other than the ECC offline correction, it is not necessary to spend the time to execute the ERP steps ranging from the first step to the 99th step that need be executed for data sectors in the data area. This makes it possible to prevent the performance from decreasing. To be more specific, the firmware executes the ERP step of the ECC offline correction for the load/unload area earlier than that for the data area.

Reassignment when Read Hard Error Occurs

When a read error occurs, each step of ERP is executed in order. A retry (reread) is made on an ERP step basis. When the retry succeeds, the ERP ends. If the maximum number of retries which is specified for a case where a retry results in failure is reached, or at a point of time at which the last ERP step is completed, the ERP ends. Then, the controller 55 notifies the system of a read hard error.

Some ERP steps include reassignment by which data of a data sector in which an error has occurred is written at another position on the magnetic disk, that is to say, to an alternate sector, so as to disallow thereafter the use of the data sector in which the error has occurred. This is because if an error which has occurred in a data sector is not recovered by specified ERP steps, there is a high possibility that an error will occur again, and accordingly there is a high possibility that a read hard error which cannot be recovered will occur in future. The reassignment is performed for the purpose of preventing such an error from occurring.

As conditions in which the reassignment is executed in the ERP for the data area, for example, the following conditions are specified: (a) a write hard error has occurred at the time of writing data; (b) a read error which has occurred at the time of reading data has been recovered by a certain specific ERP step; and (c) a read hard error has occurred at the time of reading data, then data is written to a data sector in which this read hard error has occurred, and as a result of performing write verification for the written data, a read hard error has occurred again. There is a magnetic disk drive capable of performing automatic reassignment by which if any one of the above conditions is satisfied, data of a data sector in which an error has occurred is automatically moved and written to an alternate sector. Irrespective of the host equipment, the automatic reassignment is executed by the firmware of the magnetic disk drive.

In this embodiment, if a command to write data to a data sector in the load/unload area, in which a read hard error has occurred, is received from the host equipment next time, instead of writing the data to the data sector in question, the firmware executes automatic reassignment to write the data to an alternate sector thereof. If a read hard error occurs in a data sector of the load/unload area, there is a high possibility that a scar on a recording surface would cause the read hard error. Therefore, even if write verification is performed to check writing, there is a high possibility that the read hard error will occur again. Moreover, the performance of the magnetic head tends to decrease with the decrease in temperature. Therefore, if a recovery has been made by write verification in a high temperature environment, a possibility that a read will not be able to be made in a cold temperature environment may become higher. Therefore, it is safer to write data to the alternate sector.

Automatic Reassignment for Read Error

In this embodiment, in the case of the ERP used for a read error that has occurred in a data sector of the load/unload area, automatic reassignment is executed earlier than that executed in the ERP used for a read error that has occurred in a data sector of the data area. For example, on the assumption that the automatic reassignment is executed in the 50th step in the ERP used for the data area, the automatic reassignment is executed in the 20th step in the ERP used for the load/unload area. There is a high probability that an error which has occurred in the load/unload area would be caused not by an incidental factor but by a scar. If a read error has occurred in a data sector of the load/unload area, from the viewpoint of avoiding a possibility that the read error will progress to an unrecoverable state, the use of an alternate sector is safer than the execution of the ERP to recover the error. As a result, it is possible to achieve the reliability of data in the load/unload area.

Method for Manufacturing Magnetic Disk Drives

Figure 9:
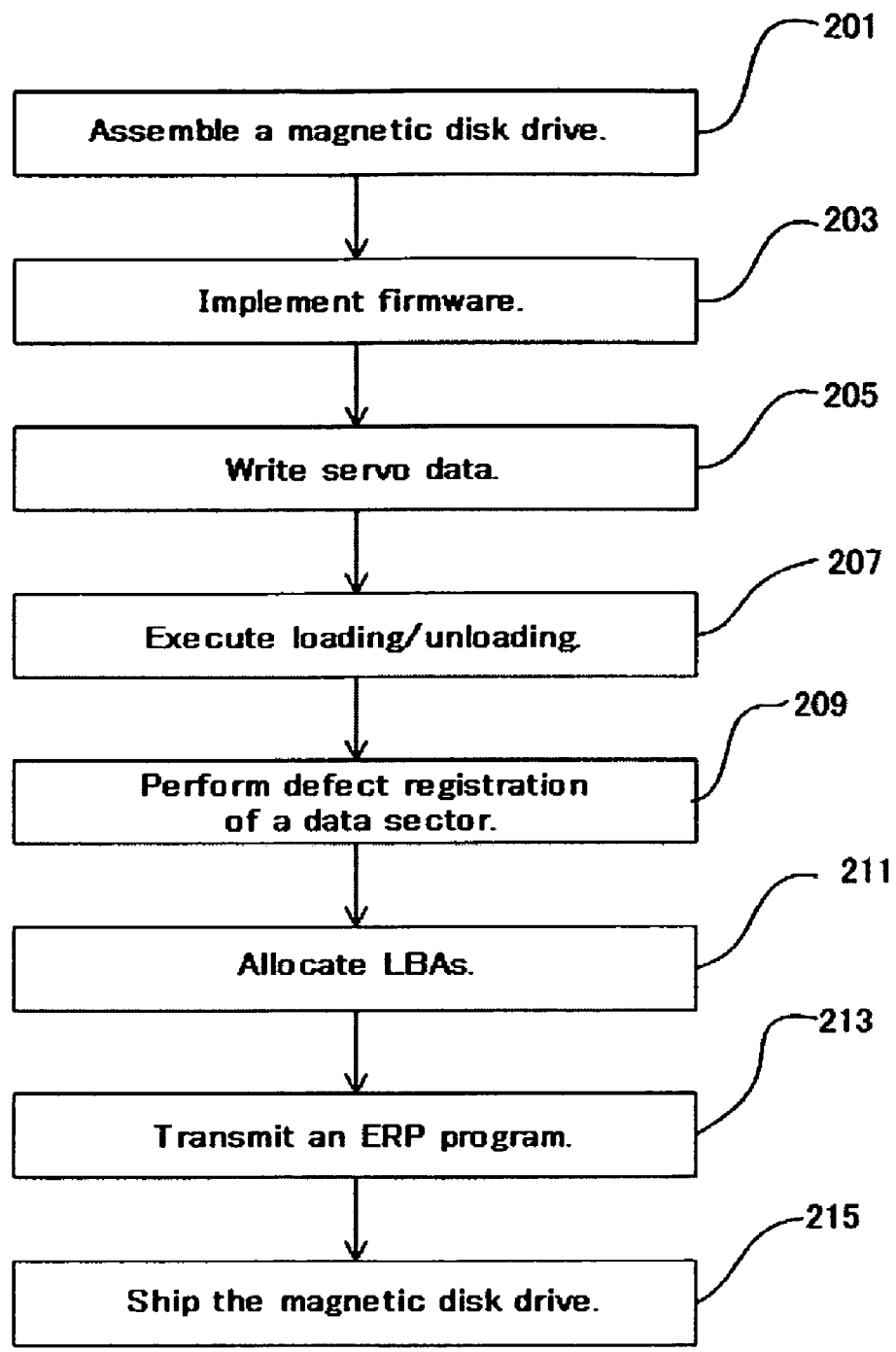
FIG. 9 is an exemplary flowchart illustrating a method for manufacturing a magnetic disk drive.

Next, a method for manufacturing the magnetic disk drive 10 according to this embodiment will be described with reference to FIG. 9. In block 201, after the magnetic disk 13, the ramp 21, the head support mechanism 15, and the like, are assembled into the base 11 in a clean room, the base 11 is covered with a base cover. After that, the circuit board 53 mounted an electronic circuit is mounted to the outside of the base 11. In this state, the magnetic disk drive 10 may communicate with the outside.

In block 203, the firmware is transmitted through the interface connector 61 to the magnetic disk drive 10 that is connected to test equipment. The firmware is then stored in the ROM of the controller 55. The firmware executes writing/reading of data to/from the load/unload area according to this embodiment. In block 205, servo data is written to the magnetic disk 13 using a known self-servo write method or using a servo track writer. The servo data is written to an area that includes at least part of the load/unload area.

In block 207, loading/unloading is repeated about from 7,000 times to 13,000 times. In block 209, the firmware defines the boundary between the data area and the load/unload area. Next, write/read tests are performed for the data area and the load/unload area to detect a defect sector, and stores an ABA of the defect sector in the PDM. At this time, an acceptance criterion for the load/unload area is made more severe than that for the data area.

The firmware is configured to assign an address number as an LBA to each data sector in the load/unload area in such a manner that the order of addressing each data sector in the load/unload area by the host equipment becomes later than that of addressing each data sector in the data area. As shown in block 211, after ABAs of defect sectors are stored in the PDM, the firmware may assign LBAs to all data sectors in such a manner that the priority given to addressing of each data sector in the load/unload area becomes lower than that given to addressing of each data sector in the data area. In block 213, an ERP program is transmitted from the test equipment, and is then stored in a dedicated area of the magnetic disk. The firmware is configured to execute the ERP program on the assumption that the order of steps and conditions of reassignment differ between the ERP used for the data area and the ERP used for the load/unload area. In block 215, a magnetic disk drive having characteristics according to this embodiment is completed. In this embodiment, by using the load/unload area including cylinders, the number of which is 11.5% of the total number of cylinders, as an area to which data is written, the storage capacity could be increased by about 11% excluding data sectors for which defect registration has been performed.

Up to this point, the present embodiment has been described on the basis of the specific embodiments shown in the diagrams. The present embodiment, however, is not limited to the embodiments illustrated in the diagrams. Needless to say, so long as the effects of the present embodiment are produced, any configuration which is known in the past may also be adopted.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a head/slider mounted to a magnetic head;
   a ramp on which the head/slider is unloaded;
   a magnetic disk on which a load/unload area and a data area are defined, each of the load/unload area and the data area including data sectors; and a controller to assign address numbers as a logical block address to each data sector in the load/unload area, the address numbers being inferior in addressing assign order to each address number of the logical block address assigned to each data sector in the data area, wherein the addressing assign order becomes inferior in ascending order of address number assignment, and the controller assigns a maximum value of all address numbers assigned to all data sectors on the magnetic disk, to a data sector in the load/unload area as the logical block address, and wherein the maximum value of the address numbers is assigned to a data track that is located on the innermost circumferential side among available data tracks defined in the load/unload area.

2. The magnetic disk drive according to claim 1, wherein: the addressing assign order becomes inferior on an ascending order according to the address numbers, and the controller assigns an address number that is larger than a maximum value of address numbers of data sectors in the data area, to each data sector in the load/unload area as the logical block address.

3. The magnetic disk drive according to claim 1, wherein: the load/unload area and the data area are defined so that the number of servo tracks written to the load/unload area ranges from 9% to 12% of the total number of servo tracks written to the magnetic disk.

4. The magnetic disk drive according to claim 1, wherein: an alternate sector to which a data sector of the load/unload area is reassigned is formed in the load/unload area.

5. The magnetic disk drive according to claim 1, wherein: when data is written to a data sector in the load/unload area, the data sector having no read hard error, the controller performs write verification.

6. The magnetic disk drive according to claim 1, wherein: when data is written to a data sector in the load/unload area, the controller writes the same data to another data sector in the load/unload area.

7. The magnetic disk drive according to claim 1, wherein: the controller executes error correction code offline correction of an error recovery procedure for data sectors in the load/unload area earlier than for data sectors in the data area.

8. The magnetic disk drive according to claim 1, wherein: after a read hard error occurs in a data sector of the load/unload area, upon receiving a command to write data to the data sector is received, the controller performs reassignment to an alternate sector automatically instead of writing the data to the data sector in question.

9. The magnetic disk drive according to claim 1, wherein: the controller executes reassignment automatically for data sectors in the load/unload area earlier than for data sectors in the data area, the reassignment being executed when a read error is recovered by a specific step of error recovery procedure.

10. A method for manufacturing a magnetic disk drive, the magnetic disk drive including a head support mechanism having a lift tab and supporting a head/slider; a magnetic disk; and a ramp, the method comprising:

writing servo data to the magnetic disk to define data sectors;

defining a load/unload area and a data area on the magnetic disk;

writing test data to data sectors in the load/unload area;

reading the test data to detect a read error, and then performing defect registration of the data sector of the load/unload area; and assigning an address number as a logical block address to each data sector in the load/unload area in such a manner that the addressing order of addressing data sectors in the load/unload area by host equipment becomes later than the addressing order of addressing data sectors in the data area.

11. The manufacturing method according to claim 10, wherein:

writing servo data includes writing servo data in a self-servo write method from the innermost circumferential side of the magnetic disk up to a position at which the lift tab touches the ramp.

12. The manufacturing method according to claim 10, wherein:

writing test data includes a step of repeating loading/unloading of the head/slider from/to the ramp, the number of times loading/unloading is repeated ranging from 7,000 times to 13,000 times.

13. The manufacturing method according to claim 10, wherein: performing the defect registration includes setting a criterion of defect identification for data sectors in the load/unload area at a value lower than a value for data sectors in the data area.

14. The manufacturing method according to claim 10, further comprising writing the test data to the data area, wherein detecting a read error includes, in comparison with the number of symbols of an error correction code at the time of reading the test data from each data sector in the data area, making the number of symbols of the error correction code at the time of reading the test data from each data sector in the load/unload area smaller.

15. A magnetic disk drive comprising:

a head/slider mounted to a magnetic head;

a ramp into which the head/slider withdraws;

a magnetic disk that includes a plurality of cylinders ranging from an innermost circumferential cylinder to an outermost circumferential cylinder, the cylinders being defined over the whole recording surfaces of the magnetic disk with a data area being defined on an innermost portion of cylinders and a load/unload area being defined on an outermost portion of cylinders, a plurality of data sectors being defined in each of the cylinders; and a controller that, to a first data sector located between a first cylinder selected from the data area of cylinders and the outermost circumferential cylinder, assigns as a logical block address an address number whose order of addressing by host equipment is later than the order of addressing of an address number as a logical block address assigned to a second data sector located between the first cylinder and the innermost circumferential cylinder, and to a third data sector located in an innermost cylinder of the load/unload area, the controller assigns as a logical block address an address number whose order of addressing by host equipment is later than the order of addressing of an address number as a logical block address assigned to a fourth data sector located in an outermost cylinder of the load/unload area.

16. The magnetic disk drive according to claim 15, wherein:

the controller assigns, as a logical block address, an address number to each data sector in such a manner that the order of addressing each data sector by host equipment becomes later in order of data tracks formed in lines from the first cylinder towards the innermost circumferential cylinder.

17. The magnetic disk drive according to claim 15, wherein:

the controller partitions a plurality of cylinders defined between the specific cylinder and the innermost circumferential cylinder into a plurality of zones, and assigns as a logical block address an address number to each data sector included in each of the zones in such a manner that the order of addressing each data sector included in an inside zone by the host equipment becomes later than the order of addressing each data sector included in an outside zone by the host equipment.

18. The magnetic disk drive according to claim 15, wherein:

a load/unload area and a data area are defined on the magnetic disk, and the controller selects the first cylinder as a cylinder that is defined at a position closest to the load/unload area among cylinders included in the data area.

* * * * *

UNITED STATES PATENT AND TRADEMARK OFFICE
CERTIFICATE OF CORRECTION

PATENT NO. : 7,542,223 B2  
APPLICATION NO. : 11/546200  
DATED : June 2, 2009  
INVENTOR(S) : Hashimoto et al.

Page 1 of 1

It is certified that error appears in the above-identified patent and that said Letters Patent is hereby corrected as shown below:

In the Claims:

Claim 18, column 22, line 5, please delete "a load/unload area and a data area are defined on the magnetic disk, and"

Signed and Sealed this

Fourteenth Day of July, 2009

JOHN DOLL  
*Acting Director of the United States Patent and Trademark Office*